(12) United States Patent
Blendea

(10) Patent No.: US 7,549,700 B2
(45) Date of Patent: Jun. 23, 2009

(54) MECHANISM FOR THIN SEAT LUMBAR

(75) Inventor: Horia Blendea, LaSalle (CA)

(73) Assignee: Schukra of North America, Lakeshore-Tecumseh (CA)

( * ) Notice: Subject to any disclaimer, the term of this patent is extended or adjusted under 35 U.S.C. 154(b) by 3 days.

(21) Appl. No.: 11/222,109

(22) Filed: Sep. 7, 2005

(65) Prior Publication Data

US 2006/0049679 A1     Mar. 9, 2006

Related U.S. Application Data

(60) Provisional application No. 60/607,668, filed on Sep. 7, 2004.

(51) Int. Cl.
*A47C 3/00*    (2006.01)
(52) U.S. Cl. ............... 297/284.4; 297/284.7; 297/284.8
(58) Field of Classification Search ............ 297/284.4, 297/284.7, 284.8
See application file for complete search history.

(56) References Cited

U.S. PATENT DOCUMENTS

| | | | |
|---|---|---|---|
| 4,283,046 A | | 8/1981 | Bowles, Jr. |
| 4,632,454 A | * | 12/1986 | Naert .................. 297/284.4 |
| 4,722,569 A | * | 2/1988 | Morgenstern et al. .... 297/284.7 |
| 4,957,102 A | | 9/1990 | Tan et al. |
| 5,026,116 A | * | 6/1991 | Dal Monte .............. 297/284.1 |
| 5,050,930 A | | 9/1991 | Schuster et al. |
| 5,197,780 A | * | 3/1993 | Coughlin ................ 297/284.7 |
| 5,452,868 A | | 9/1995 | Kanigowski |
| 5,474,358 A | | 12/1995 | Maeyaert |
| 5,651,583 A | | 7/1997 | Klingler et al. |
| 5,651,584 A | * | 7/1997 | Chenot et al. ............ 297/284.4 |
| 5,697,672 A | | 12/1997 | Mitchell |
| 5,791,733 A | * | 8/1998 | van Hekken et al. ..... 297/284.4 |
| 5,911,477 A | * | 6/1999 | Mundell et al. .......... 297/284.4 |
| 5,913,569 A | | 6/1999 | Klingler |
| 5,934,752 A | | 8/1999 | Klingler |
| 5,988,745 A | | 11/1999 | Deceuninck |
| 6,045,185 A | | 4/2000 | Ligon, Sr. et al. |
| 6,152,531 A | | 11/2000 | Deceuninck |

(Continued)

FOREIGN PATENT DOCUMENTS

DE          19542659 A1       5/1997

(Continued)

OTHER PUBLICATIONS

International Search Report for PCT/US2005/031858.

*Primary Examiner*—Sarah B McPartlin
(74) *Attorney, Agent, or Firm*—Kang Intellectual Property Law, LLC; Grant D. Kang

(57) ABSTRACT

A a lumbar support has a flexible seat suspension and a supporting mechanism. The lumbar support device is capable of providing an infinite number of vertical adjustment points. The supporting mechanism is connected to the flexible seat suspension by slide elements and travels up and down the side rails of the flexible seat suspension to the seat occupant's desired position. The movement of the supporting mechanism is accomplished both vertically along the flexible seat suspersion and horizonally relative to the seat by using wire cables, tractions cables, and a series of pulleys. The pulley system reduces the load of the actuators used in the lumbar device making it possible to use smaller, less expensive actuators.

23 Claims, 7 Drawing Sheets

U.S. PATENT DOCUMENTS

| | | |
|---|---|---|
| 6,158,300 A | 12/2000 | Klingler |
| 6,199,951 B1 | 3/2001 | Zeile et al. |
| 6,338,530 B1 * | 1/2002 | Gowing .................. 297/284.4 |
| 6,634,046 B2 | 10/2003 | Schuster |
| 6,682,144 B2 | 1/2004 | Klingler |
| 6,779,844 B2 * | 8/2004 | Dosen et al. ............. 297/284.4 |
| 6,805,680 B2 | 10/2004 | Klingler |
| 6,860,559 B2 | 3/2005 | Schuster, Sr. et al. |
| 6,905,170 B2 | 6/2005 | McMillen et al. |
| 6,908,153 B2 * | 6/2005 | Blendea .................. 297/284.4 |
| 2004/0080202 A1 | 4/2004 | Stadlbauer |

FOREIGN PATENT DOCUMENTS

| | | |
|---|---|---|
| EP | 0 128 407 B1 | 7/1987 |
| EP | 0458440 A1 | 11/1991 |
| FR | 1543602 A | 10/1968 |
| GB | 2 342 287 A | 4/2000 |
| GB | 2362818 A | 12/2001 |
| JP | 2000062506 | 2/2000 |
| JP | 2004208813 | 7/2004 |

* cited by examiner

MECHANISM FOR THIN SEAT LUMBAR

CROSS-REFERENCE TO RELATED APPLICATIONS

This application claims priority to U.S. Provisional App. No. 60/607,668 filed Sep. 7, 2004.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to lumbar support devices and, more particularly, to lumbar support devices for use in thin packaging spaces.

2. Related Art

Lumbar support devices are well known in the art. Lumbar support is important for achieving an anatomically correct seating posture. If an individual does not receive proper back support, it can lead to lower back pain, increased muscle activation, increased tension on ligaments, and increased pressure on the spine. With the recent trend of car manufacturers reducing the packaging size available for the lumbar support mechanism, seat manufactures have been looking for ways to provide the needed lumbar support with thinner lumbar devices. As such, it is extremely important to develop a lumbar support system that is thin in packaging size but will provide appropriate lumbar support.

The production of lumbar support though the use of a flexible seat suspension in combination with other elements has long been known in the art. However, the flexible seat suspension mechanisms used in the prior art only allowed the seat occupant to receive lumbar support at certain heights along the seat. As such, the occupant was not always able to have the greatest lumbar support at the exact height in which he/she desired. Rather, the occupant would have to settle for the location at which the lumbar was provided.

Accordingly, there remains a need for a lumbar support system that is thin in packaging dimension and can provide an infinite number of heights at which lumbar support may be provided to the seat occupant.

SUMMARY OF THE INVENTION

It is in view of the above problems that the present invention was developed. The invention is a lumbar support device having a flexible seat suspension, a cross member, and a pulley system actuated by a series of actuators and cables. In this system, the seat occupant may apply lumbar support in varying degrees at any position vertically along the flexible seat suspension because the support mechanism is allowed to slide along the side rails of the flexible seat suspension. As such, the occupant may receive lumbar support at the exact location in which it is desired. Furthermore, due to the use of the pulley system within this invention, the moving parts of the system may be actuated within a small dimension thereby assuring a small packaging size. Finally, this lumbar support system is less expensive to manufacture than most lumbar support devices because the pulley system allows the use of smaller, less expensive actuators and allows for an opportunity to use less expensive Kelvar wires instead of the normal steel cables.

In the present invention, the flexible seat suspension is attached to the seat frame. A support mechanism is attached to the side rails of the flexible seat suspension via two slide elements. The slide elements allow the support mechanism to move vertically up and down the flexible seat suspension. The support mechanism consists of a cross member that is mounted on two sliding brackets which in turn are mounted on the seat frame. The cross member may move in a horizontal direction from a position further away from the flexible seat suspension to a position closer to the flexible seat suspension, and vice versa. Movement in the direction of the flexible seat suspension will force the flexible seat susDension to bend, thus providing support to the occupant at that location. An in/out wire moves the cross member in and out relative to the flexible seat suspension. The wire is run through a series of pulleys and along the backside of the cross member. When the actuator actuates the in/out cable wire, the cross member is moved forward towards the flexible seat suspension. When the actuator moves in the opposite direction, the pressure exerted upon the cross member is reduced such that the pressure exerted by the foam of the seat and/or the weight of the seat occupant will push the cross member in a direction away from the flexible seat suspension consequentially reducing the amount of support being applied to the seat occupant. The cross member also is connected to an up/down wire. The up/down wire runs in a diagonal direction across the back of the cross member. When the up/down wire is actuated, the movement of the up/down wire forces the cross member to move up or down the flexible seat suspension side rails. The diagonal design ensures that each side of the flexible seat suspension moves the same distance and at the same pace.

The pulley system used in this invention provides many advantages. First, it assists in reducing the load of the actuators used within this lumbar device. As such, smaller, less expensive actuators may be used. Second, it transmits movement from the actuator to the moving parts of the cross member while avoiding interference with the foam of the seat or other seat components. Finally, the pulley system potentially allows for the use of a wire made of Kelvar. The Kelvar wire is cheaper and less resistant to breaking especially when used in conjunction with the plastic pulley wheels. In such cases when Kelvar wire is used, the plastic pulley wheels may even be fixed such that the wire merely slides along the path created by the pulley rather than turning around the moving wheel.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention.

DETAILED DESCRIPTION OF THE PREFERRED EMBODIMENTS

Figure 1:
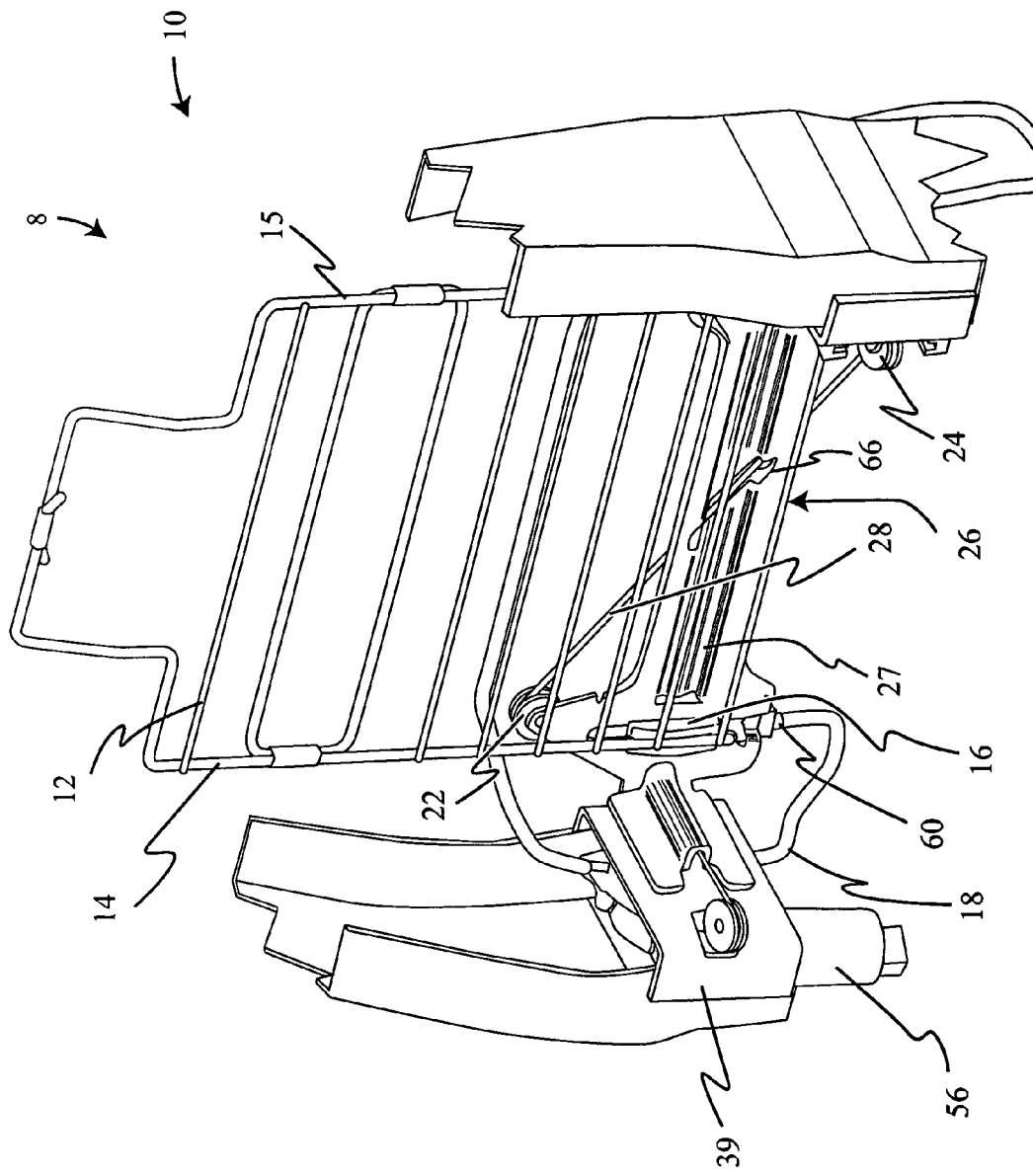
FIG. 1 illustrates a front view of the lumbar support device.
Figure 2:
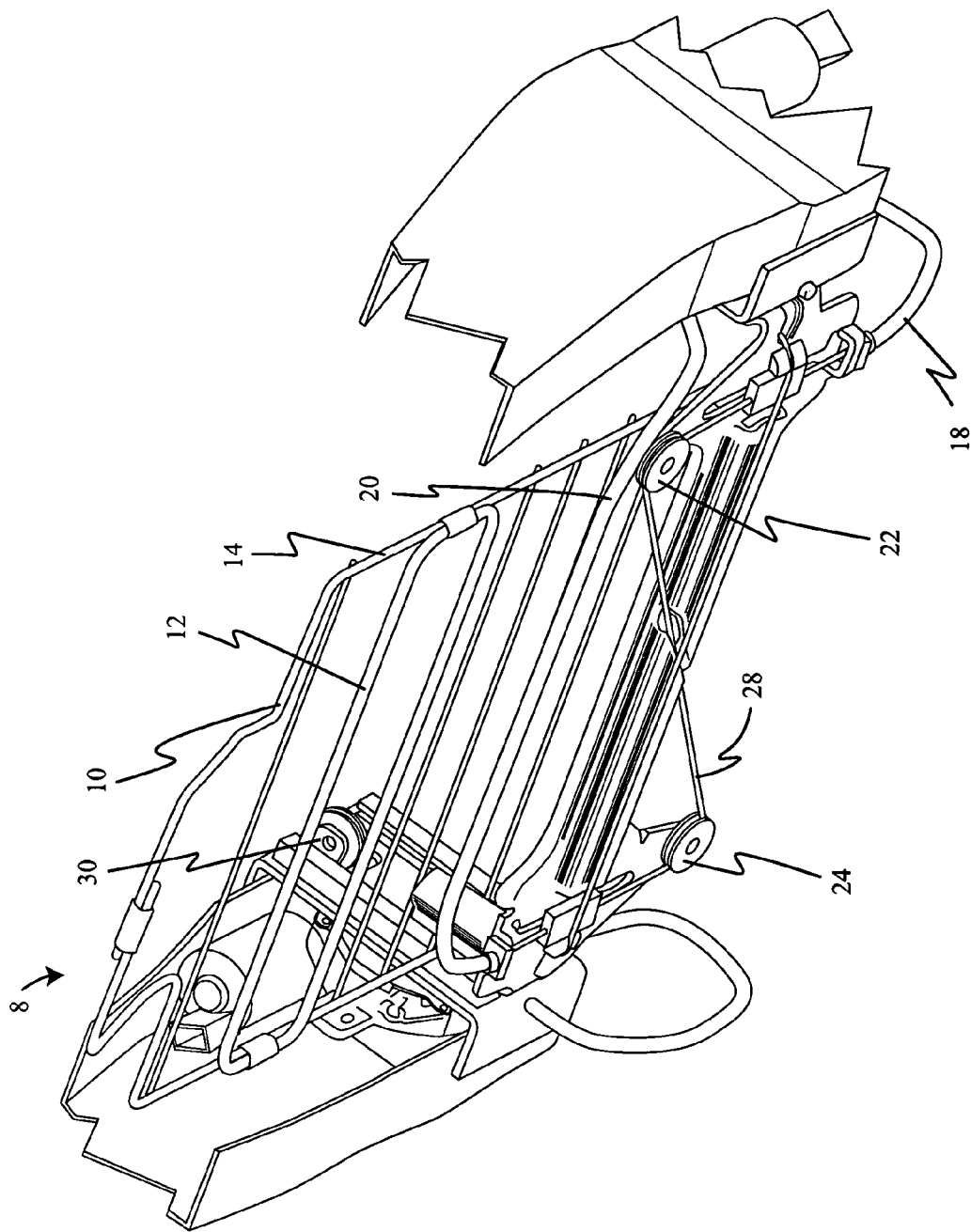
FIG. 2 illustrates a rear view of the lumbar support device.
Figure 7:
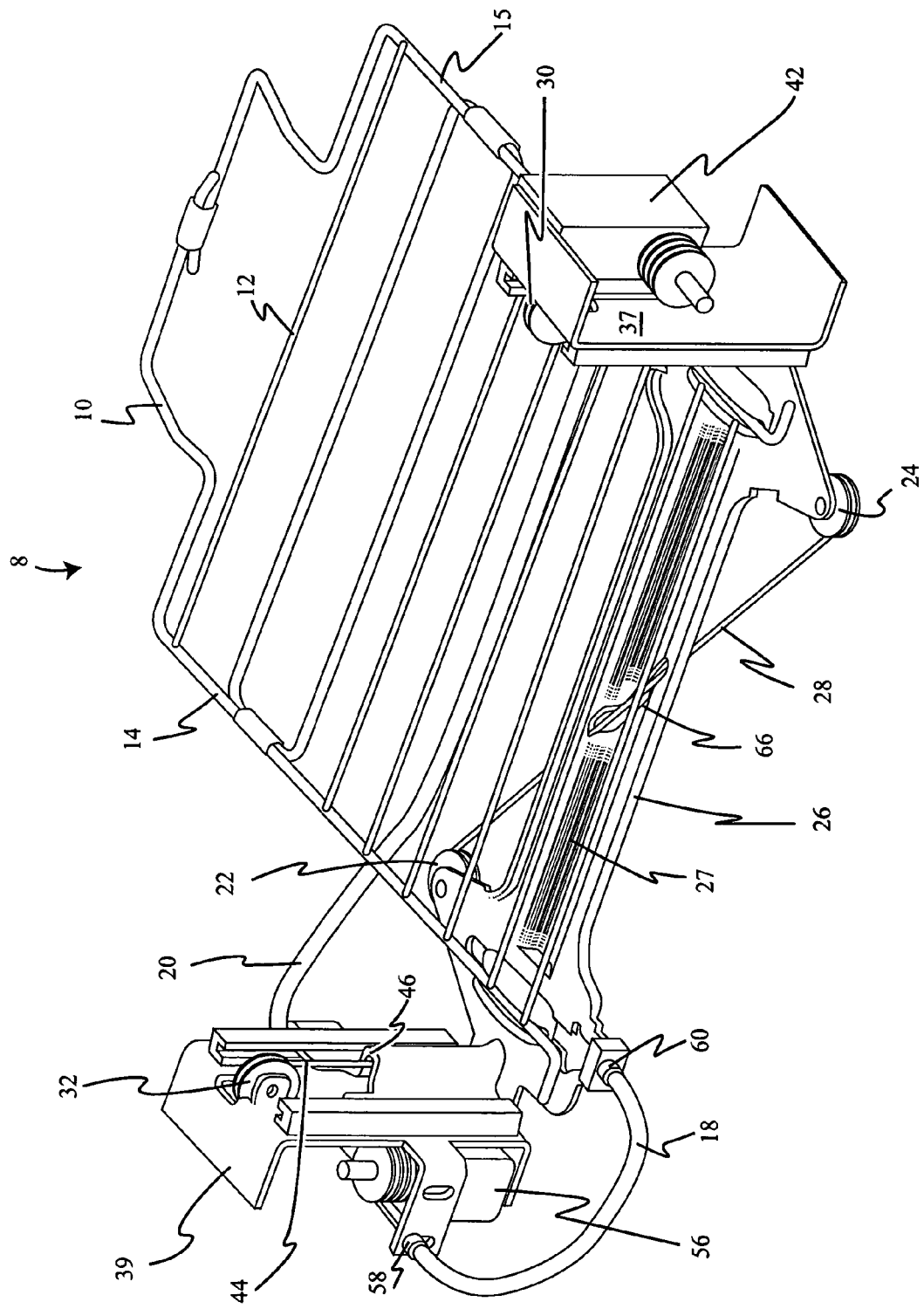
FIG. 7 illustrates a front perspective view of the lumbar support device.

As shown in FIGS. 1, 2 and 7, the preferred embodiment of this lumbar support device 8 includes a flexible seat suspension 10. The flexible seat suspension 10 consists of a pair of side rails 14 and 15 and a plurality of transverse supporting wires 12 connecting the side rails 14 and 15. It should be noted that the term "flexible seat suspension" is defined to include any supporting wires that may assume varying geometrical configurations between the side rails 14 and 15, such that the transverse supporting wires might not be parallel between the side rails 14 and 15. In addition, the transverse supporting wires 14 and 15 are not required to be coplanar with the side rails 14 and 15. The flexible seat suspension 10 is fixedly attached to the seat frame at various points along the top and bottom of the flexible seat suspension 10. When pressure is applied to the surface of the flexible seat suspension 10, it is capable of bending in a concave position relative to the seat frame, thus producing lumbar support to the seat occupant at the point in which the concave position exists.

The flexible seat suspension 10 is connected to a support mechanism 36 via two slide elements 16. These slide elements 16 may be designed such that the side rails 14 and 15 of the flexible seat suspension 10 are merely placed within a groove of the slide elements 16 or they may take the form of clips so that the slide elements 16 do not lose connection with the side rails 14 and 15 during operation.

As seen in FIGS. 3-6, the slide elements 16 are fixedly attached to the cross member 26. The body 27 of the cross member 26 runs perpendicular to the side rails 14 and 15 and parallel to the transverse supporting wires 12. The cross member 26 has two arms 37 and 39 which extend in a perpendicular direction from the body 27 of the cross member 26. The two arms 37 and 39 are attached to sliding brackets 34 which in turn are fixedly attached to the seat frame 40. The cross member 26 is free to move along the length of these sliding brackets 34 from a position away from the flexible seat suspension 10 to a position closer to the flexible seat suspension 10, and vice versa.

FIGS. 3-6 also depict the support mechanism of the present invention. The horizontal movement of the support mechanism is accomplished through the use of at least one in/out actuator 42, an in/out wire 44, and two separate horizontal pulleys 30 and 32. The horizontal pulleys 30 and 32 are located in a position within the sliding bracket 34. The first end of the in/out wire 44 is operatively engaged with the in/out actuator 42 such that the in/out actuator 42 may apply traction to the in/out wire 44. The second end of the in/out wire 44 is fixedly attached to the seat frame 54, or any other stationary object in the area such as the sliding bracket 34. If so desired, instead of attaching the second end of the in/out wire 44 to the seat frame 54 or the sliding bracket 34, the second end of the in/out wire 44 may also be attached to the in/out actuator 42. If this is done, the attachment will occur in a difference area of the actuator than the attachment of the first end.

The in/out wire 44 travels from the in/out actuator 42 around the first horizontal pulley 30 down through an indentation 46 in the arm 37 of the cross member 26 and around the backside of the body 27 of the cross member 26 relative to the flexible seat suspension 10. The in/out wire 44 continues along the entire length of the back of the cross member 26 where it sits in a grooved portion 50. The grooved portion 50 of the back of the cross member 26 helps to ensure that the in/out wire 44 stays in place during operation. This grooved portion 50 may also take the form of a clip. The in/out wire 44 runs completely across the rear of the cross member 26, then travels up through the indentation 46 of the arm 39, and then around a second horizontal pulley 32 where it is then attached to the seat frame 54, the sliding bracket 34, or looped around the back of the cross member 26 and attached to the in/out actuator 42. On the backside of the cross member 26 where the cross member body 27 meets the arms 37 and 39, there exists two cable ramps 52. These cable ramps 52 are generally made of plastic but can be made of any material that reduces the friction between the back side of the cross member 26 and the in/out wire 44. These cable ramps 52 also lift the in/out wire 44 slightly from the back of the cross member 26 so that the in/out wire 44 will not make contact with the up/down wire 28.

Figure 5:
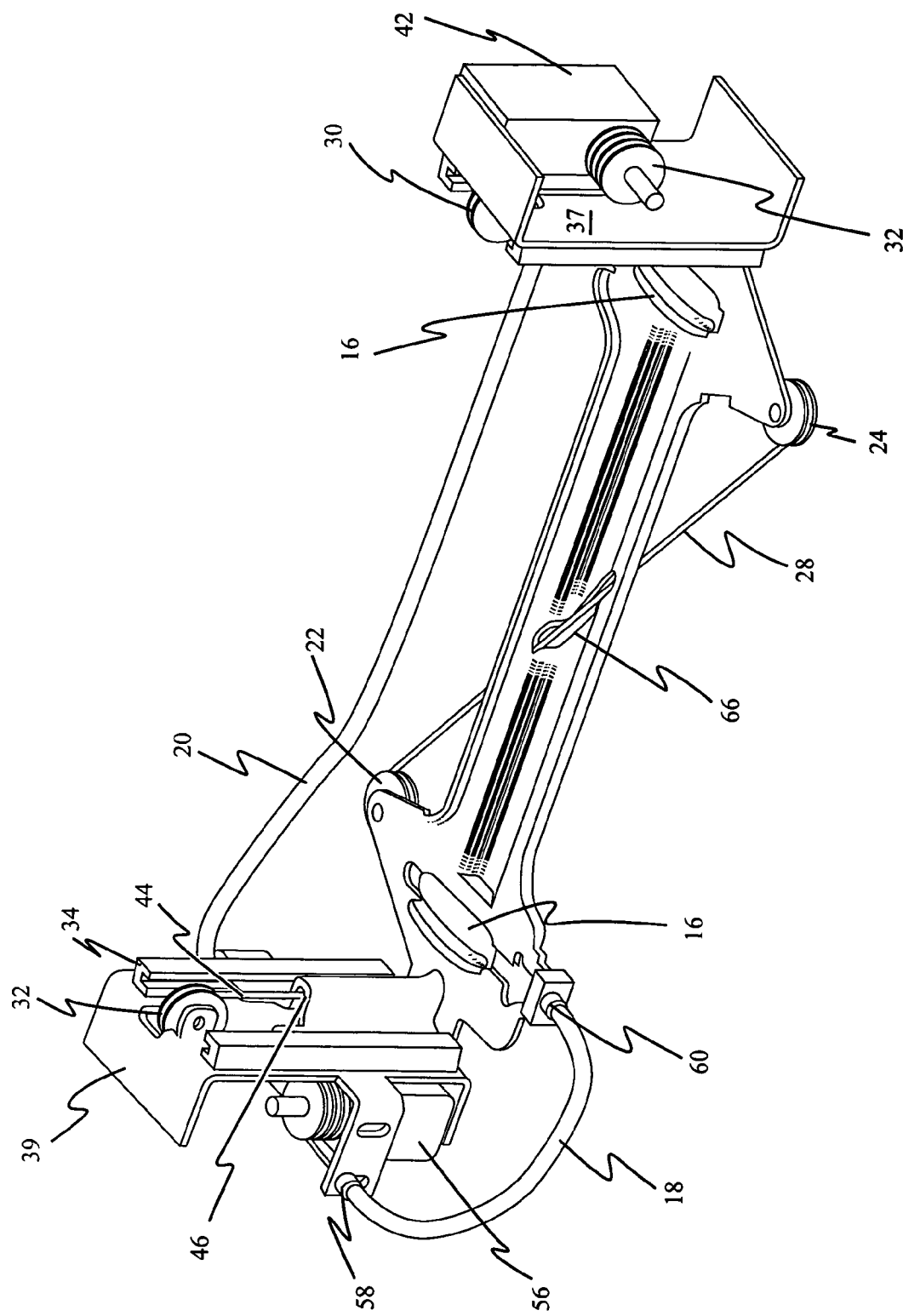
FIG. 5 is a front perspective view of the support mechanism in combination with the sliding brackets, the up/down actuator, and the in/out actuator.

As can be deciphered from FIG. 5, horizontal movement of the cross member along the sliding brackets 34 occurs when the in/out actuator 42 applies traction to the first end of the in/out wire 44. The force is transferred along the pulley system such that it causes the cross member 26 to move in a horizontal direction towards the flexible seat suspension 10. The cross member 26 may move a distance equal to the length in which the arms 37 and 39 are allowed to travel in the sliding brackets 34. When the cross member 26 is moved in a horizontal direction, it exerts pressure upon the flexible seat suspension 10 causing an apex to form at that location in the flexible seat suspension 10. Such apex is where the greatest amount of lumbar support will be provided to the seat occupant.

Figure 6:
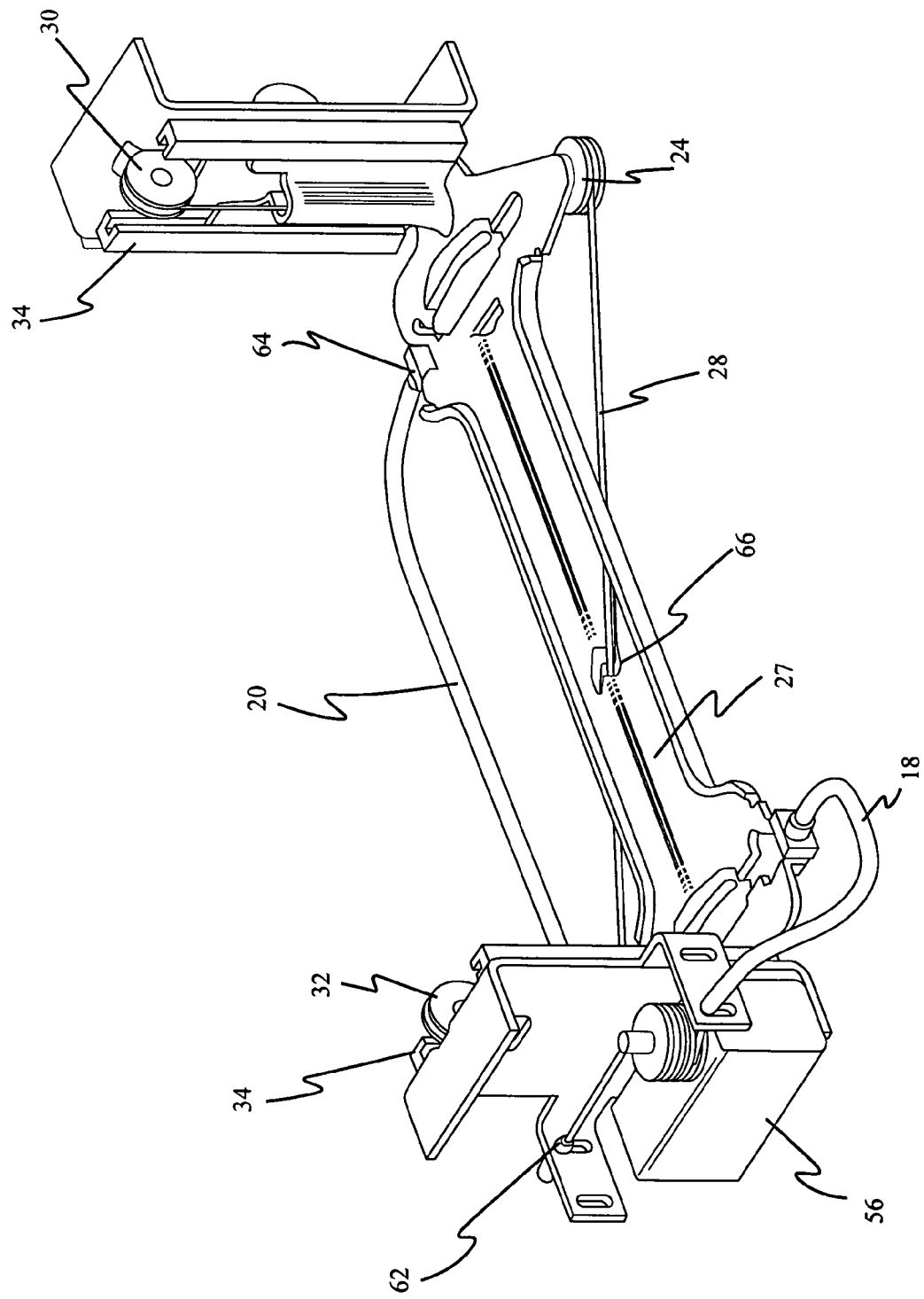
FIG. 6 is another front perspective view of the support mechanism in combination with the sliding brackets and the up/down actuator.

The support mechanism 36 is also capable of moving up and down the side rails 14 and 15 of the flexible seat suspension 10. FIG. 6 depicts the support mechanism such that the up/down actuator 56 may be viewed. The up/down wire 28 is attached to a vertical actuator 56. The type of cable used for the up/down wire 28 is a traction cable, sometimes called a Bowden cable. Generally, a Bowden cable has a sheath with a wire coaxially disposed within the sheath and sliding within it. At one end of the Bowden cable is an actuator. The actuator may be a manual device such as a hand wheel or lever, or it may be a power device such as an electric motor and gear assembly. At the other end of the traction cable, the sleeve is generally fixedly mounted to a bracket or other attachment and the wire, proceeding from the end opening of the sleeve, is attached to a moving component of the lumbar support system.

In this invention, however, both ends of the Bowden cable are attached to the up/down actuator 56. In addition, this Bowden cable possesses two different sleeves, an up sleeve 20 and a down sleeve 18. Both ends of the up sleeve 20 are fixedly attached, one at 62 and the other at 64. Likewise, both ends of the down cable 18 are fixedly attached, one at 58 and one at 60.

One end of the up/down wire 28 travels from its attachment point on the up/down actuator 56 through the up sleeve 20 until it reaches the sleeve attachment point 64 where it then travels under the slide element 16 and around the first vertical pulley 24. The up/down wire 28 continues over this first vertical pulley 24 in a diagonal direction relative to the cross member 26 and goes through a notch 66 located within the cross member body 27. It then continues round the second vertical pulley 22. At this point, the wire 28 extends under the slide element 16 and into the down sleeve 18. The wire 28 continues through the down sleeve 18 and is attached to another portion of the up/down actuator 56. The two ends of the up/down wire 28 are attached to the up/down actuator 56 such that movement of the actuator 56 in one direction causes the cross member 26 to move up the flexible seat suspension side rails 14 and 15 and movement of the actuator 56 in the opposite direction causes the cross member 26 to move down the side rails 14 and 15 of the flexible seat suspension 10.

Figure 3:
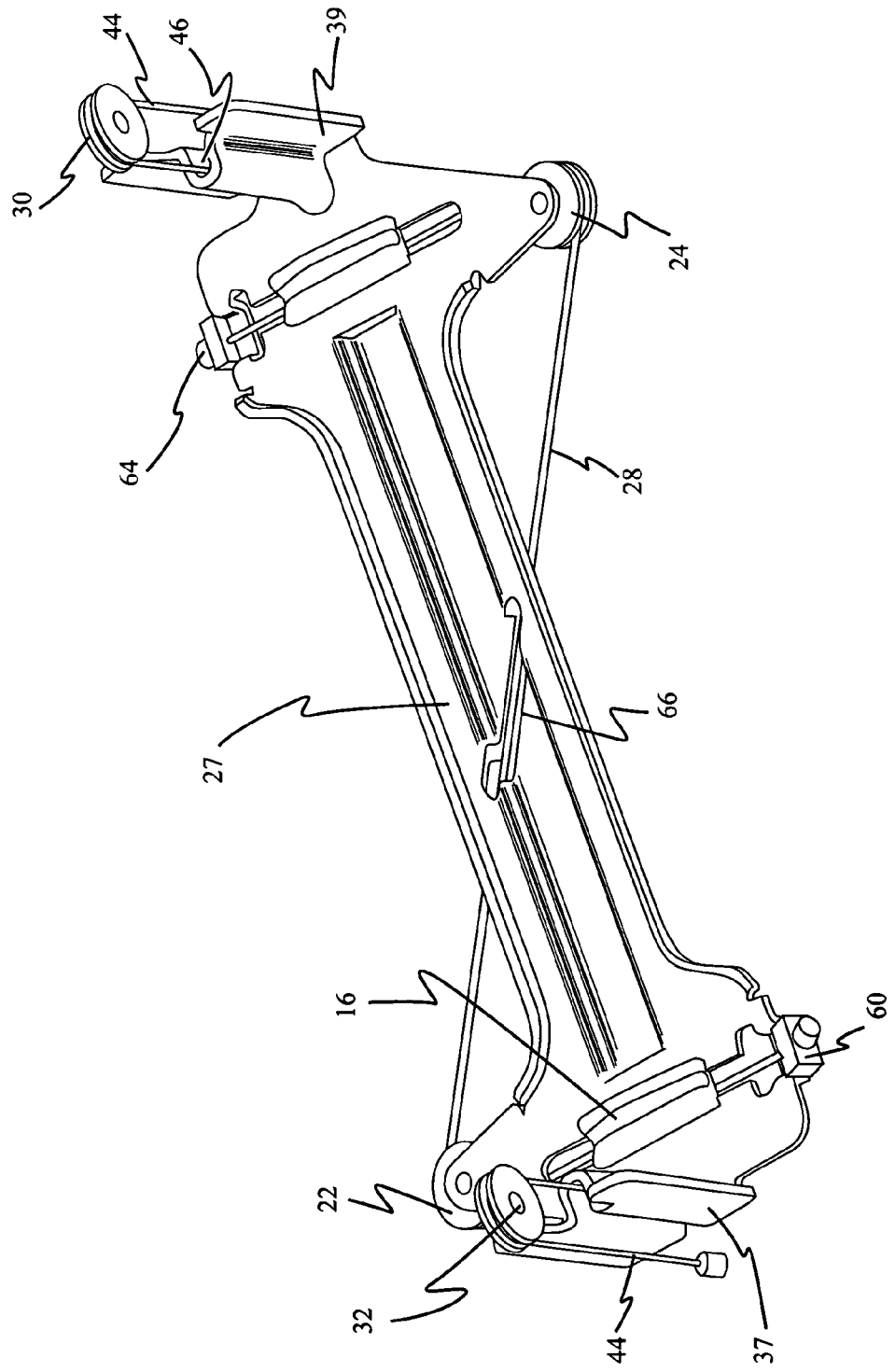
FIG. 3 illustrates a front view of the support mechanism in isolation.
Figure 4:
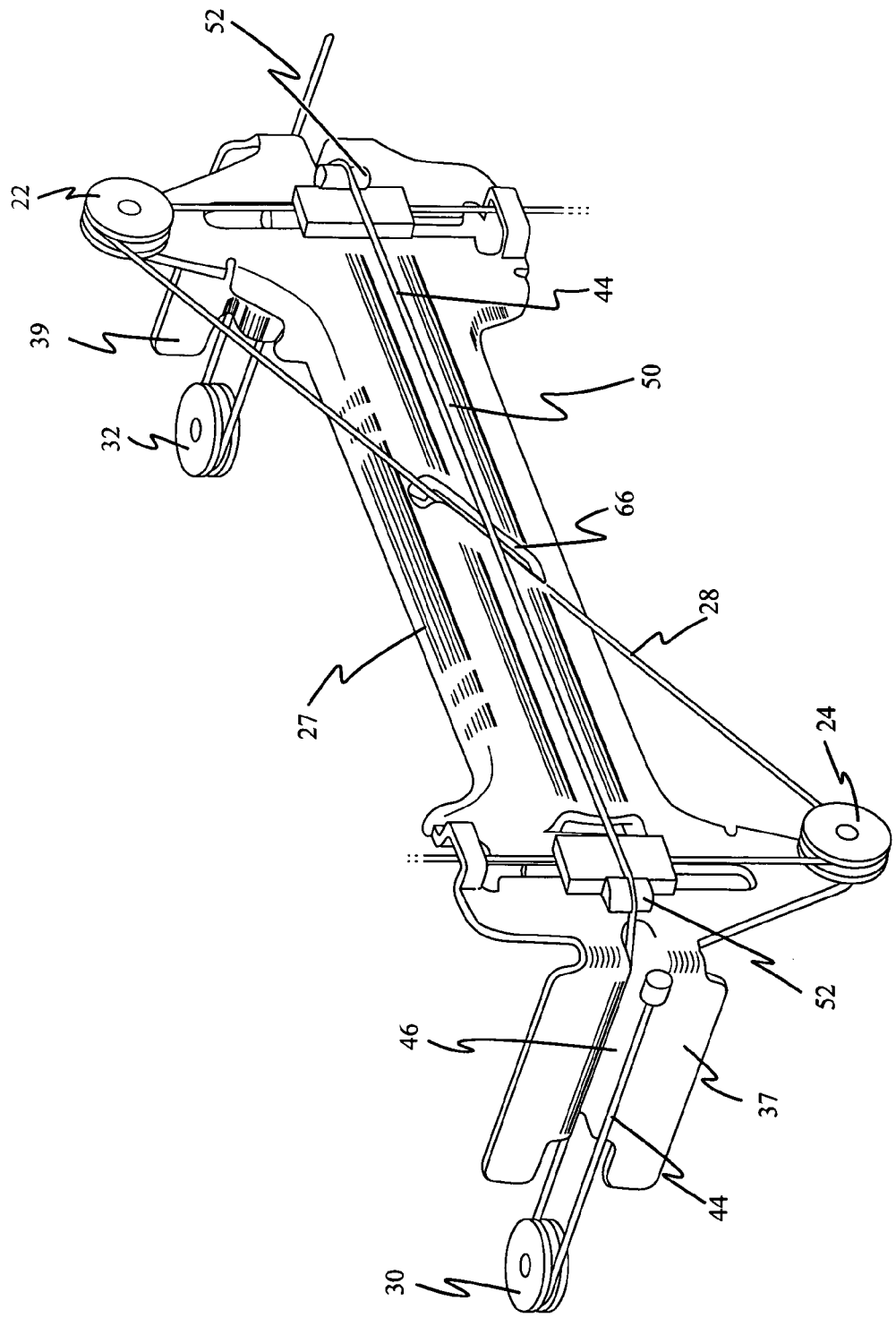
FIG. 4 illustrates a rear perspective view of the support mechanism in isolation.

FIGS. 3-5 shows the detail of the notch 66 located within the cross member body 27 and the first and second vertical pulleys, 24 and 22 respectively. The vertical pulleys 24 and 22 are located on opposite ends and opposite sides of the cross member 26 such that when the up/down wire 28 is thread from the first vertical pulley 24 to the second vertical pulley 22, the wire 28 cuts diagonally across the cross member 26. A notch 66 exists in the middle of the cross member body 27 such that the up/down wire 28 will not make contact with the grooved portion 50 of the back of the cross member 26 or with the in/out wire 44 running along that grooved portion 50. The diagonal positioning of the vertical pulleys 24 and 22 transfers the forces over the cross member 26 equally such that each end of the cross member 26 will move the same distance and at the same rate when traction is applied in either direction by the up/down actuator 56.

In view of the forgoing it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A lumbar support device comprising:
   a flexible seat suspension having a pair of side rails and a plurality of supporting wires running between said side rails, said plurality of supporting wires capable of bending in a convex position relative to a seat occupant; and
   a supporting mechanism having a cross member, and a sliding bracket, said cross member capable of supporting at least one of said plurality of supporting wires in the direction of the seat occupant;
   wherein said cross member is adapted to travel in a first direction parallel to said flexible seat suspension and along said side rails of said flexible seat suspension and is adapted to travel in a second direction perpendicular to said flexible seat suspension and along said sliding bracket.

2. The lumbar support device of claim 1 wherein said cross member has an arm and a body, said arm extending in a direction perpendicular to said body and communicating with said sliding bracket.

3. The lumbar support device of claim 2 wherein said arm of said cross member has an indentation.

4. The lumbar support device of claim 2 wherein the side of said body of said cross member opposite said flexible seat suspension contains a grooved portion.

5. The lumbar support device of claim 4 wherein said grooved portion forms a clip.

6. The lumbar support device of claim 1 wherein said cross member contains a slide element in communication with at least one of said side rails of said flexible seat suspension.

7. The lumbar support device of claim 6 wherein said slide element has a groove.

8. The lumbar support device of claim 6 wherein said slide element has a clip.

9. The lumbar support device of claim 1 wherein said sliding bracket is attached to a seat frame.

10. The lumbar support device of claim 1 wherein said cross member has at least two vertical pulleys.

11. The lumbar support device of claim 1 further comprising:
    an in/out wire, said in/out wire having a first end and a second end;
    wherein said first end of said in/out wire is operatively engaged with an in/out actuator for applying traction to said in/out wire; and
    said second end of said in/out wire is operative engaged to a second section of said in/out actuator such that when traction is applied to said in/out wire by said in/out actuator in one direction, said cross member moves in a direction towards said flexible seat suspension and when the traction applied by said in/out actuator is applied in a second direction, said cross member moves in a direction away from said flexible seat suspension.

12. The lumbar support device of claim 11 wherein said in/out actuator is a power actuator.

13. The lumbar support device of claim 11 wherein said in/out actuator is a manual actuator.

14. A lumbar support device comprising:
    a flexible seat suspension having a pair of side rails and a plurality of supporting wires running between said side rails;
    a supporting mechanism having a cross member, and a sliding bracket;
    wherein said cross member is adapted to travel in a first direction parallel to said flexible seat suspension and along said side rails of said flexible seat suspension and is adapted to travel in a second direction perpendicular to said flexible seat suspension and along said sliding bracket, and wherein said cross member has at least two vertical pulleys;
    a traction cable, said traction cable having a sleeve and having a wire disposed to slide axially within said sleeve, said sleeve and said wire each having a first end and a second end;
    said first ends of said sleeve and said wire being operatively engaged with an actuator for applying traction to said traction cable; and
    said second end of said wire being wrapped around said vertical pulleys and being attached to said actuator such that when traction is applied to said traction cable by said actuator in a first direction, said cross member moves in a vertical direction up said side rails of said flexible seat suspension and when traction is applied to said traction cable by said actuator in a second direction, said cross member moves in a vertical direction down said side rails of said flexible seat suspension.

15. The lumbar support device of claim 14 wherein said actuator is a power actuator.

16. The lumbar support device of claim 14 wherein said actuator is a manual actuator.

17. The lumbar support device of claim 14 further comprising:
   an in/out wire, said in/out wire having a first end and a second end;
   wherein said first end of said in/out wire is operatively engaged with an in/out actuator for applying traction to said in/out wire; and
   said second end of said in/out wire is fixedly attached to a seat frame such that when traction is applied to said in/out wire by said in/out actuator, said cross member moves in a direction towards said flexible seat suspension and when the traction applied by said in/out actuator is released, said cross member is free to move in a direction away from said flexible seat suspension.

18. The lumbar support device of claim 17 wherein said cross member contains a notch such that said traction cable wire may be placed within said notch so as to prevent communication with said in/out wire.

19. A lumbar support device comprising:
   a flexible seat suspension having a pair of side rails and a plurality of supporting wires running between said side rails;
   a supporting mechanism having a cross member, and a sliding bracket;
   wherein said cross member is adapted to travel in a first direction parallel to said flexible seat suspension and along said side rails of said flexible seat suspension and is adapted to travel in a second direction perpendicular to said flexible seat suspension and along said sliding bracket;
   an in/out wire, said in/out wire having a first end and a second end;
   wherein said first end of said in/out wire is operatively engaged with an in/out actuator for applying traction to said in/out wire; and
   said second end of said in/out wire is fixedly attached to a seat frame such that when traction is applied to said in/out wire by said in/out actuator, said cross member moves in a direction towards said flexible seat suspension and when the traction applied by said in/out actuator is released, said cross member is free to move in a direction away from said flexible seat suspension.

20. The lumbar support device of claim 19 further comprising:
   a cable ramp wherein said cable ramp is attached to the side of said cross member opposite said flexible seat suspension.

21. The lumbar support device of claim 19 wherein said in/out actuator is a power actuator.

22. The lumbar support device of claim 19 wherein said in/out actuator is a manual actuator.

23. The lumbar support device of claim 19 further comprising:
   a horizontal pulley, said horizontal pulley being operatively engaged with said in/out wire.

* * * * *